United States Patent [19]
Pöschl

[11] Patent Number: 5,564,402
[45] Date of Patent: Oct. 15, 1996

[54] ARRANGEMENT FOR THE PRESSURE ATOMIZATION OF LIQUID FUEL AND PROCESS FOR THE SAME

[75] Inventor: Günter Pöschl, Schwaikheim, Germany

[73] Assignee: PPV-Verwaltungs-AG, Zurich, Switzerland

[21] Appl. No.: 373,205

[22] PCT Filed: Jul. 16, 1992

[86] PCT No.: PCT/DE92/00585

§ 371 Date: Jan. 13, 1995

§ 102(e) Date: Jan. 13, 1995

[87] PCT Pub. No.: WO94/02783

PCT Pub. Date: Feb. 3, 1994

[51] Int. Cl.$^6$ ................................. F02M 29/00
[52] U.S. Cl. ................................. 123/590
[58] Field of Search ................... 123/536, 537, 123/538, 590, 522; 261/DIG. 48

[56] References Cited

U.S. PATENT DOCUMENTS

| | | |
|---|---|---|
| 1,917,577 | 7/1933 | Doble, Jr. . |
| 3,672,341 | 6/1972 | Smith et al. ............................ 123/536 |
| 3,977,604 | 8/1976 | Yokoyama et al. ..................... 239/102 |
| 4,029,064 | 6/1977 | Csaszar et al. ................... 261/DIG. 48 |
| 4,123,481 | 10/1978 | Herold et al. .................... 261/DIG. 48 |
| 4,227,817 | 10/1980 | Gerry ..................................... 366/127 |
| 5,026,167 | 6/1991 | Berliner, III ................... 261/DIG. 48 |

FOREIGN PATENT DOCUMENTS

| | | |
|---|---|---|
| 0856342 | 11/1952 | Germany . |
| 2443452 | 4/1976 | Germany . |
| 2124095 | 2/1984 | United Kingdom . |
| WO8300446 | 2/1983 | WIPO . |

*Primary Examiner*—Noah P. Kamen
*Attorney, Agent, or Firm*—Panitch Schwarze Jacobs & Nadel, P.C.

[57] ABSTRACT

An arrangement for the pressure atomization of liquid fuel and process for the same.

An arrangement for the pressure atomization of liquid fuel, preferably with an atomizing nozzle charged with pressurized fuel. A reaction chamber (10) with at least one ultrasonic oscillator (26) is disposed in the fuel line (32) before the atomizing nozzle. The reaction chamber (10) is preferably charged with oxygen-enriched air, liquid fuel and water. For the homogenization of the mixing components a mechanical cavitation element can be disposed in the reaction chamber (10). The cavitation element preferably comprises a rapidly rotating, discus-shaped disc having axial bores. The fuel mixture created in the chamber (10) in the form of a fine foam is combusted with a high degree of efficiency, nitrogen oxides do not result, particularly whenever oxygen-enriched air is used.

24 Claims, 2 Drawing Sheets

ARRANGEMENT FOR THE PRESSURE ATOMIZATION OF LIQUID FUEL AND PROCESS FOR THE SAME

FIELD OF THE INVENTION

This invention refers to an arrangement for the pressure atomization of liquid fuel preferably with an atomizer nozzle charged with pressurized fuel, and to a process relating thereto.

BACKGROUND OF THE INVENTION

Pressure atomization of liquid fuels is known from heating and motor vehicle technology. The efficiency of the combustion depends, in addition to other parameters such as the droplet size of the fuel mist produced on an adequate supply of oxygen being available for the combustion process. The air feed to the flame, however, is fundamentally limited by the nitrogen sheath forming around the flame, isolating the flame region to a certain degree.

An atomizer nozzle and a process for the ultrasonic atomization of liquid fuel that are similar to the arrangement and the process according to claims 1 and 18, respectively, are known from the U.S. Pat. No. 3,977,604. A disc-shaped ultrasonic oscillator is used therein for improving the atomization and the combustion efficiency. The disc-shaped oscillator is arranged in a cloud chamber, spaced from the inner wall of the same. At its bottom the cloud chamber has an outlet with an annular ultrasonic oscillator. The fuel fed centrally to the disc-shaped oscillator is atomized at its upper face, so that a fuel mist is produced, leaving the cloud chamber at its bottom via the outlet and a main nozzle attached thereto.

The ultrasonic atomization has certain advantages over the conventional pressure atomization. The fuel mist distinguishes itself by a smaller average droplet size. The fuel feed can take place via a dosing pump working at normal pressure, which is substantially simpler and less expensive than the high-pressure pump with pressure regulator necessary in a pressure atomizer. Finally, the droplet size can be adjusted via the frequency of the ultrasonic oscillator as a function of the viscosity of the fuel (special edition of 'Keramische Zeitschrift' (29) No. 1/1977 "Flüssigkeitszerstäubung mit piezokeramischen Ultraschall-Schwingern" (Atomization of Liquids using Piezoceramic Ultrasonic Oscillators)).

As in ordinary pressure atomization, the combustion efficiency in the use of ultrasonic atomizers is also limited in that the combustion, i.e. the flame cone, can not be supplied with an adequate quantity of air or oxygen.

SUMMARY OF THE INVENTION

The invention is based on the object of increasing the efficiency of the pressure atomization of liquid fuel, particularly with an atomizer nozzle, and in particular to solve the problem of how more air or oxygen can be introduced into the flame cone of the combustion.

This object is carried out as given in claims 1 and 18 and can be advantageously further developed in accordance with the subclaims.

According to the invention, an element excited with a certain frequency, preferably a piezoelectric or magnetically excited ultrasonic oscillator, is used to transform the liquid fuel into a sort of foam. The oscillator in this connection does not serve for the conventional production of droplets in the liquid-gas interface, but rather for a quasi opposite process in which microscopic volumes of air are drawn into the liquid. To what extent this phenomenon as well can be explained by the capillary wave hypothesis is of lesser significance in the present context. What is decisive is that with the arrangement and/or the process according to the invention a nucleation of the air in the liquid fuel can be achieved. The consistency of this air-fuel mixture can be most nearly described as foam-like.

This fuel foam is conveyed under pressure in a conventional manner to a specially designed atomizer nozzle and is atomized and combusted there in a conventional manner. The combustion efficiency is enormously increased by the air released in the flame cone itself; temperatures of up to 2000 C. have been measured in the flame cone. As a result of the high temperatures virtually no water vapor develops; the harmful nitrogen oxides developing in motor vehicle engines can be reduced by more than 80%. The arrangement and/or process according to the invention is therefore particularly suitable for diesel engines, the emission values of which are lowered through the application of the invention to such an extent that a catalytic converter connected after the engine can be omitted. Since the tiny gas bubbles enclosed by liquid are pressurized, the liquid fuel is atomized upon exiting into the atmosphere totally independently of the relaxation effect in the atomizer nozzle. This atomization is based primarily on the inner pressure of the enclosed tiny gas bubbles. Due to this effect, providing a special atomizer nozzle can become superfluous. It is sufficient in certain cases for the foam to enter into open space or the combustion chamber from a pipe outlet.

Decisive for the invention was the idea of using the oscillation element or the ultrasonic oscillator not for the actual atomization, but rather in a completely new context, namely for the production of a fuel foam carrying with it the oxygen needed for the combustion and transporting the same directly into the flame space. The utilization of piezoceramic ultrasonic oscillators for atomizing liquid therefore could not supply a stimulus for the invention.

According to an advantageous further development of the invention, an amplitude transformer is connected downstream of the preferably piezoceramic element freely oscillating in a chamber. This amplitude transformer is, for instance, a sleeve-like part set into a pipe-shaped neck of the chamber housing. A helical groove through which the air-fuel mixture is conveyed is cut into the outer hull of the sleeve. The amplitude transformer is excited to a resonant oscillation by the piezoceramic element. On flowing around the amplitude transformer the enclosed air is therefore even more finely diffused and the foam is further homogenized.

Under certain conditions the amplitude transformer can be omitted and replaced with a mechanical cavitation element in the reaction space. This cavitation element is a rapidly rotating discus-shaped disc having several axial bores. A flow through these bores is caused by the Bernoulli effect, and with this a homogenization of the air/fuel mixture occurs.

It has proved advantageous to use air enriched with oxygen. For the enrichment of the air with oxygen ambient air under pressure is conducted over nitrogen-absorbing zeolites.

To prevent a spontaneous ignition of the oxygen/fuel mixture in the reaction chamber, water is also introduced into the reaction chamber. The proportion of water lies between 30 and 50 mol % related to the oil quantity.

Under the effect of the mechanical cavitation element and the ultrasonic energy the water molecules are split up into radicals, the efficiency of the combustion is thereby increased even further, and the exhaust values are further improved; virtually only carbon dioxide and water vapor result.

BRIEF DESCRIPTION OF THE DRAWINGS

In the following the invention is described by way of example on the basis of the attached drawings.

DESCRIPTION OF THE PREFERRED EMBODIMENTS

Figure 1:
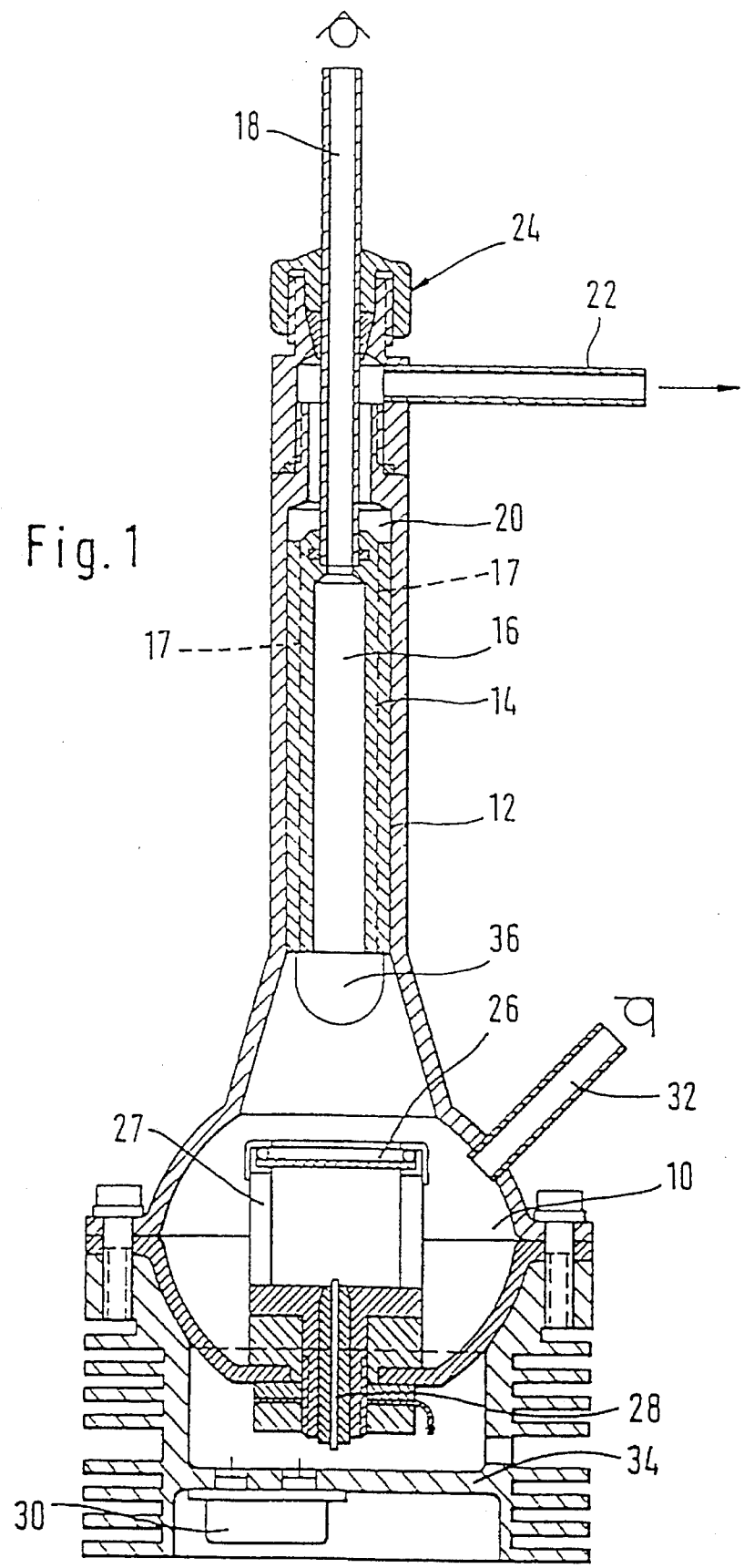
FIG. 1 shows a schematic cross section through an arrangement for pressure atomization connected before the atomizer nozzle.

In the embodiment shown in FIG. 1 the chamber 10 is provided in the shape of a pot and has a pipe-shaped neck 12. A sleeve-like part 14 is set into the pipe-shaped neck 12. The sleeve-like part 14 has an inner bore 16 opening into the chamber 10 at one end and being connected to a feed conduit 18 for compressed air at the other end. Threads 17 are cut into the outer casing of the sleeve-like part 14, forming channels in cooperation with the inner wall of the pipe-shaped neck 12, with said channels leading from the interior of the chamber 10 into a delivery chamber 20 at the upper end of the pipe-shaped neck 12 behind the sleeve-like part 14. A conduit 22 leads from this delivery chamber 20 to the atomizer nozzle.

The feed conduit 18 for the compressed air is sealingly passed through the delivery chamber 20; the end of the pipe-shaped neck 12 is sealed against the supply line 18 by a stuffing box 24.

The helical channels in the outer wall of the sleeve-like part 14 are arranged as in a multiple-start thread, their lead being a function of the viscosity of the liquid fuel and the length of the sleeve 14. In one embodiment the lead is 7 mm. The lower the viscosity of the fuel, the more threads are cut into the outer hull of the sleeve-like part 14.

The amplitude transformer or sleeve-like part 14 preferably consists of a ceramic material such as $Al_2O_3$ with a sonic speed of more than 6000 m/sec. Such materials are especially well suited due to their high resonance frequencies and their hardness; they are only slightly stressed by the cavitation phenomena occurring.

A disc-shaped piezoceramic element 26 is located in the interior of the chamber 10. The element is clamped in a pipe-shaped pedestal 27 in such a way that it can freely oscillate inside the liquid. For this it is connected by a flexible cable (not shown) to an electrode 28 electrically connected in turn to a frequency generator 30. Depending on the viscosity of the fuel to be foamed, electromagnetically excited oscillation elements can also be used instead of the piezoceramic element.

Frequency generators for ultrasonic oscillators are known. For example, their structure is described in the European patent application 0 340 470 and the German laying-open print 36 25 149. In the present context it is merely important that the generator circuit be constructed in such a way that different frequencies can be impressed on the oscillating element. The frequencies depend on the geometry of the piezoceramic element, on the viscosity of the liquid fuel and, finally, on the desired selection of the air components—each of the gas components ordinarily present in air has a different optimum frequency at which it is "dissolved".

A feed conduit 32 for the liquid fuel is connected to the housing of the chamber 10. The fuel is fed to the chamber 10 under a certain pressure, with the pressure in the air feed line 18 being several millibars higher than the pressure in the fuel conduit 32.

The housing of the chamber 10 preferably consists of a stainless chrome nickel steel. The housing of the chamber 10 can be set in a stand 34 with heat-dissipating ribs.

The mode of operation of the described arrangement is as follows.

The fuel chamber 10 is filled with liquid fuel. Slightly pressurized air is pressed via the air conduit 18 through the inner bore 16 of the sleeve-like part 14 into the chamber 10. A sort of air bubble 36 with an interface between liquid and air comes into being in the interior of the chamber.

When the ultrasonic oscillator is activated, minute air volumes are drawn at the interface into the liquid by a sort of inverse capillary wave effect and are conveyed upwards through the helical channel in the outer wall of the amplitude transformer 14 into the delivery chamber 20 as a result of the pressure difference between the outlet 22 and the inlet 32. A further homogenization of the liquid foam formed takes place in the helical channel or channels of the amplitude transformer 14, i.e. the enclosed air volumes are further reduced in size and diffused.

In one embodiment 2.3 mg of air were "dissolved" in 20 ml of liquid fuel. This fuel foam is transported from the delivery chamber 20 via conduit 22 to an atomizer nozzle, where it is atomized and combusted. As a result of the oxygen released in the flame itself the efficiency of the combustion increases enormously; combustion temperatures of approximately 2000 C. are reached.

Lead zirconate titanate ceramics has proved itself as a material for the piezoceramic element; however, other ceramic materials such as barium titanate ceramics are likewise suitable.

The shown placement of the ultrasonic oscillator is merely given as an example. The piezoceramic element can also be fastened differently. In the embodiment according to FIG. 1 it is mounted freely oscillating in the interior of chamber 10. It is also possible to place it in the wall of the housing, if the liquids involved have a particularly low viscosity. The geometry of the oscillating element is likewise of secondary importance; instead of the disc shown here other forms can also be used.

Figure 2:
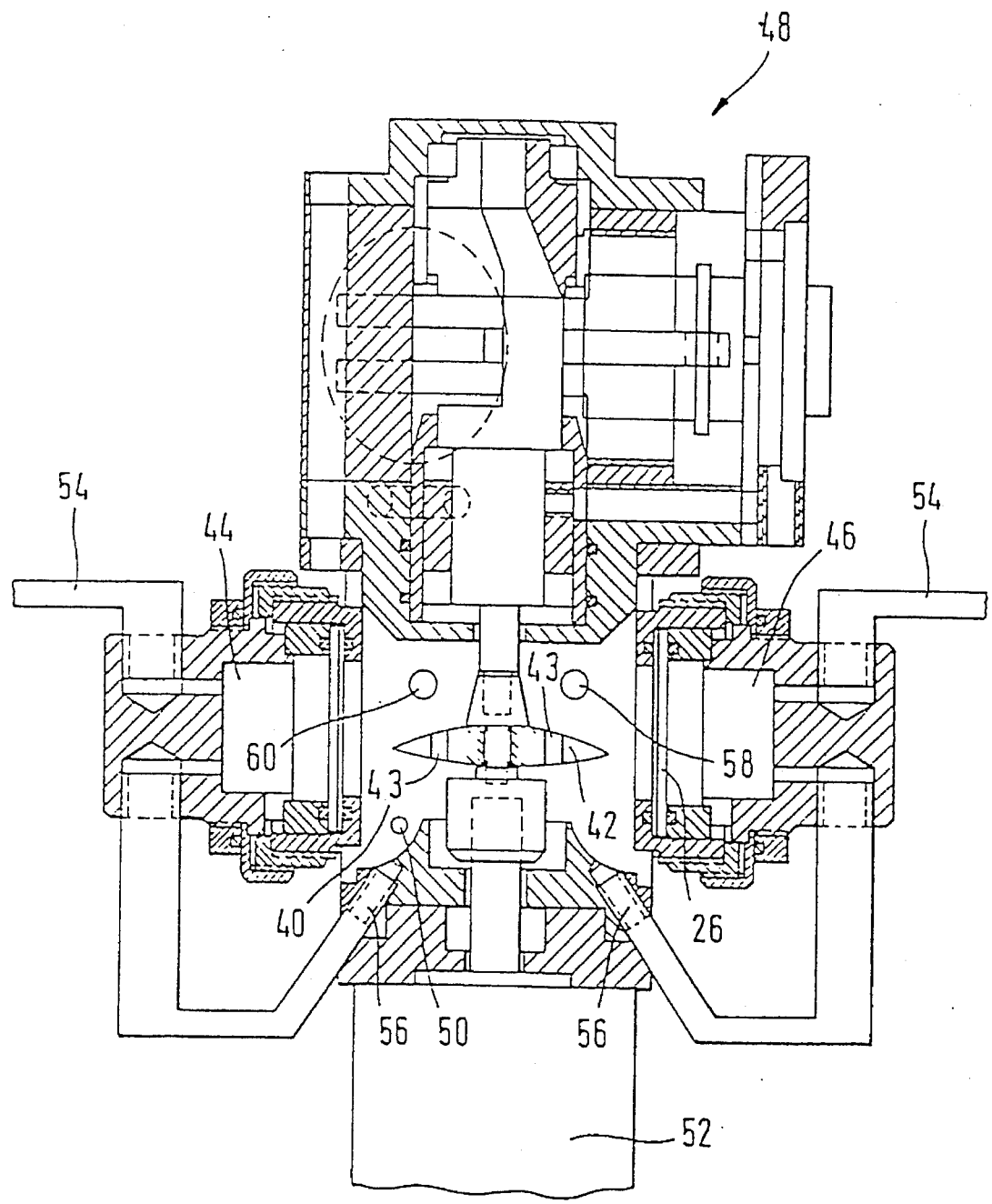
FIG. 2 shows a schematic cross section through another embodiment of an arrangement for pressure atomization.

The embodiment shown in FIG. 2 differs from that of FIG. 1 primarily in that instead of the downstream amplitude transformer a mechanical cavitation element 42 is located in the fuel chamber 40. In the wall of the fuel chamber or reaction space, two ultrasonic oscillators 44 and 46 are provided opposite one another. The structure of these oscillators corresponds to the one described in connection with the embodiment of FIG. 1. Instead of the arrangement shown, another arrangement of the oscillators can also be selected; however, at least one oscillator must be present.

A compressor 48 compressing the air and pressing it under high pressure, for instance 40 bars, through a packed zeolite bed is located above the reaction chamber 40. In the zeolite bed, in which atmospheric nitrogen is absorbed, the proportion of oxygen is increased to 60 to 92%. This oxygen-enriched air is fed to the reaction space via a correspondingly dimensioned capillary tube 50. The packed zeolite bed and the air conduit arrangement are not shown in FIG. 2. The integration of the compressor 48 into the apparatus has the advantage that the quantity of air conveyed rises or drops from the beginning as a function of rotational speed. The motor for driving the apparatus is labeled 52. The motor drives the mechanical cavitation element 42 and the shaft of the compressor 48.

The fuel to be loaded with oxygen is supplied via conduits 54. A portion of the fuel, preferably oil, thereby reaches the rear side of the piezoelectric elements, the efficiency and function of which are improved by the good electrical insulating property of the oil supplied. A portion of the oil, however, is directly introduced into the reaction chamber 40. The corresponding connection pieces are labeled 56.

Water is supplied via a capillary tube 58, with the pressure and the diameter of the entrance pipe being dimensioned such that the proportion of water amounts to approximately 30 to 50 mol % of the oil quantity.

The cavitation element 42 has different curvatures on its lower and its upper sides. The curvature of the upper side is preferably more pronounced than that of the lower side, which can have a flatter profile. Several axial bores 43 are provided in the discus-shaped cavitation element, which bores enable a flow of liquid from the lower side of the element to the upper side. The peripheral edge of the cavitation element is very sharp, in order to prevent a flow around the same as much as possible, similarly to the wing of an airplane.

Now the cavitation element, when rotating at approximately 3000 to 8000 revolutions per minute, has the effect that, as a result of the Bernoulli effect, a pressure difference arises between the upper side and the lower side, causing an intensive axial flow through the bores. The blending thereby effected is so intensive that a homogenous suspension of water, oil and oxygen-rich air is formed within an extremely short time. This suspension is further homogenized and nucleated through the action of the ultrasonic oscillator and the thereby initiated sonochemical reactions. The oil foam developing in the reaction space is drawn off via the conduit 60 and conveyed for instance to a burner or an atomizer nozzle. The efficiency of the combustion is very good as a result of the high combustion temperatures. Since virtually no nitrogen oxides result, a catalytic converter, for instance in motor vehicles, for purifying exhaust can be omitted.

I claim:

1. An arrangement for the pressure atomization of liquid fuel comprising:
    a chamber disposed in a fuel conduit, the chamber for being filled with liquid fuel;
    at least one oscillator mounted to freely oscillate in the midst of the liquid fuel in a predetermined frequency range; and
    an air conduit opening into the chamber for introducing pressurized air into the chamber with a pressure corresponding at least to a pressure of the liquid fuel, the air conduit defining in part an amplitude transformer having at least one channel connected downstream from the chamber wherein the oscillator oscillating in the midst of the liquid fuel produces a foam-like fuel-air mixture which flows through the at least one channel.

2. The arrangement according to claim 1, wherein the at least one oscillator is a piezoelectric ultrasonic oscillator.

3. The arrangement according to claim 1, wherein the amplitude transformer consists of a ceramic material.

4. The arrangement according to claim 1, wherein the chamber includes a pipe-shaped neck having an inner wall and the amplitude transformer comprises a sleeve-like part sealingly set into the pipe-shaped neck, wherein thread grooves cut in an outer casing of said sleeve-like part, in cooperation with the inner wall of the said pipe-shaped neck form the at least one channel, the channel for conveying the fuel-air mixture to an atomizer nozzle, and wherein the air is fed to the chamber through an inner bore of the sleeve-like part.

5. The arrangement according to claim 4, wherein the channel opens into a delivery chamber at the downstream end of the pipe-shaped neck, with the air-fuel mixture being fed therefrom to the atomizer nozzle.

6. The arrangement according to claim 5, wherein the air conduit sealingly passes through the delivery chamber and opens into the inner bore of the sleeve-like part.

7. The arrangement according to claim 4, wherein the at least one oscillator is disposed in the interior of the chamber and the pipe-shaped neck opens into the chamber.

8. The arrangement according to claim 4, further comprising a frequency generator disposed outside of the chamber wherein the at least one oscillator is connected to the frequency generator.

9. The arrangement according to claim 1, wherein the at least one oscillator comprises a disc of a piezoceramic material supported approximately centrically in the chamber by a pipe-shaped pedestal.

10. The arrangement according to claim 1, wherein the at least one oscillator consists of lead zirconate titanate ceramics.

11. An arrangement for the pressure atomization of liquid fuel comprising;
    a chamber disposed in a fuel conduit;
    at least one oscillator for oscillating in a predetermined frequency range;
    an air conduit opening into the chamber for introducing pressurized air into the chamber with a pressure corresponding at least to the pressure of the liquid fuel; and
    a rotating cavitation element disposed in the chamber, wherein the chamber is filled with liquid fuel when in operation and the oscillator is mounted to freely oscillate in the midst of the liquid fuel such that a foam-like fuel-air mixture is produced.

12. The arrangement according to claim 11, wherein the cavitation element comprises a discus-shaped disc having two principal, opposing surfaces with different curvatures.

13. The arrangement according to claim 11, further comprising a compressor driven by a shaft of the cavitation element for compressing air fed into the chamber.

14. The arrangement according to claim 11, wherein the at least one oscillator comprises at least two diametrically opposed oscillators disposed in a wall of the chamber.

15. The arrangement according to claim 14, wherein a portion of the fuel conducted into the chamber is introduced at a rear side of the diametrically opposed oscillators.

16. The arrangement according to claim 11, further comprising a water-conducting capillary tube which opens into the chamber, with the diameter of the capillary tube being dimensioned such that the proportion of water in the chamber amounts to between 30 and 50 mol % related to the quantity of liquid fuel.

17. A process of pressure atomization of liquid fuel, with at least one oscillator disposed in a chamber, comprising the steps of:
    filling the chamber with liquid fuel such that the fuel encompasses the oscillator on all sides;
    conducting compressed air into the chamber wherein the pressure of the compressed air is at least as high as the pressure of the liquid fuel; and causing the at least one oscillator to oscillate to mix the fuel and the air such that the fuel is enriched with air and is atomized to a foam-like fuel-air mixture.

18. The process according to claim 17, wherein in the chamber filled with fuel an interface is formed between the compressed air and the liquid fuel.

19. The process according to claim 17, wherein the air-fuel mixture is pressed through a channel of an amplitude transformer and wherein the amplitude transformer resonates with the at least one oscillator.

20. The process according to claim 17, wherein the fuel is loaded with oxygen-enriched air.

21. The process according to claim 20, wherein the proportion of oxygen in the compressed air is between 60 and 92%.

22. The process according to claim 17, wherein water is introduced into the chamber.

23. The process according to claim 22, wherein the proportion of water amounts to between 30 and 50 mol %, related to the quantity of liquid fuel.

24. The process according to claim 17, further comprising the step of homogenizing the compressed air and the liquid fuel with a rapidly rotating cavitation element.

\* \* \* \* \*